United States Patent
Illgner et al.

(10) Patent No.: US 12,474,623 B2
(45) Date of Patent: Nov. 18, 2025

(54) IMAGING SYSTEM, IN PARTICULAR FOR A CAMERA

(71) Applicant: K|LENS GMBH, Saarbrücken (DE)

(72) Inventors: Klaus Illgner, Starnberg (DE); Matthias Schmitz, Saarbrücken (DE)

(73) Assignee: K|LENS GMBH, Saarbrucken (DE)

( * ) Notice: Subject to any disclaimer, the term of this patent is extended or adjusted under 35 U.S.C. 154(b) by 236 days.

(21) Appl. No.: 18/027,769

(22) PCT Filed: Sep. 21, 2021

(86) PCT No.: PCT/EP2021/075872
§ 371 (c)(1),
(2) Date: Mar. 22, 2023

(87) PCT Pub. No.: WO2022/063746
PCT Pub. Date: Mar. 31, 2022

(65) Prior Publication Data
US 2023/0333448 A1    Oct. 19, 2023

(30) Foreign Application Priority Data

Sep. 22, 2020 (LU) ......................................... 102084

(51) Int. Cl.
*G03B 11/00* (2021.01)
*G02B 5/20* (2006.01)
(Continued)

(52) U.S. Cl.
CPC .............. *G03B 11/00* (2013.01); *G02B 5/201* (2013.01); *G02B 27/08* (2013.01); *G03B 17/12* (2013.01); *G03B 17/17* (2013.01); *H04N 23/957* (2023.01)

(58) Field of Classification Search
None
See application file for complete search history.

(56) References Cited

U.S. PATENT DOCUMENTS 9,936,188 B2 *    4/2018    Klehm ............... G02B 27/0075

FOREIGN PATENT DOCUMENTS

WO    2014124982 A1    8/2014

OTHER PUBLICATIONS

International Search Report Dated Dec. 8, 2021, PCT/EP2021/075872, 2 Pages.
(Continued)

*Primary Examiner* — James M Hannett
(74) *Attorney, Agent, or Firm* — LUCAS & MERCANTI, LLP; Klaus P. Stoffel

(57) ABSTRACT

An imaging system having multiple imaging devices arranged in succession in the direction of an optical axis, including a first imaging device for generating a real intermediate image of an object on an intermediate image plane, a second imaging device for generating a virtual mirror image of the real intermediate image, the mirror image being laterally offset to the real intermediate image on the intermediate plane, and a third imaging device for imaging the real intermediate image and the virtual mirror image together as a real image on an image receiver surface to be arranged at an axial distance to the intermediate image plane. The imaging system has an optical filtering device for filtering the imaging of the real intermediate image and/or at least one of the virtual mirror images separately from each other. The imaging system includes the image receiver surface and a device for processing a real image captured by the image receiver surface. The processing device uses the image to determine positions in the direction of the optical axis of object region points, which are imaged by at least individual pixels of the pixels of the image.

26 Claims, 3 Drawing Sheets

(51) Int. Cl.
    G02B 27/08      (2006.01)
    G03B 17/12      (2021.01)
    G03B 17/17      (2021.01)
    H04N 23/957     (2023.01)

(56) References Cited

OTHER PUBLICATIONS

Manakov Alkhazur et al. "A reconfigurable camera add-on for high dynamic range multispectral, polarization, and light-field imaging" ACM Transactions on Graphics, US, vol. 32, No. 4, Jul. 21, 2013 (Jul. 21, 2013), pp. 1-14.

Kazemzadeh Farnoud et al. "Multispectral Stereoscopic Imaging Device: Simultaneous Multiview Imaging From the Visible to the Near-Infrared" IEEE Transactions on Instrumentation and Measurement, IEEE Service Center, Piscataway, NJ, US, vol. 63, No. 7, Jul. 1, 2014 (Jul. 1, 2014), pp. 1871-1873.

Jeon Daniels et al. "Multisampling Compressive Video Spectroscopy" Computer Graphics Forum: Journal of the European Association for Computer Graphics, Oxford, vol. 35, No. 2, May 1, 2016 (May 1, 2016), pp. 467-477.

\* cited by examiner

IMAGING SYSTEM, IN PARTICULAR FOR A CAMERA

CROSS-REFERENCE TO RELATED APPLICATIONS

The present application is a 371 of International application PCT/EP2021/075872, filed Sep. 21, 2021, which claims priority of LU LU102084, filed Sep. 22, 2020, the priority of these applications is hereby claimed and these applications are incorporated herein by reference.

BACKGROUND OF THE INVENTION

The invention relates to a plenoptic imaging system, in particular for a camera, having multiple imaging devices arranged in succession in the direction of an optical axis, which comprise a first imaging device for generating a real intermediate image of an object in an intermediate image plane, a second imaging device for generating at least one virtual mirror image of the real intermediate image, which is arranged in the intermediate image plane offset to the real intermediate image, and a third imaging device for jointly imaging the real intermediate image and the virtual mirror image as a real image on an image receiver surface to be arranged at an axial distance to the intermediate image plane. The invention furthermore relates to a method for plenoptic imaging, a computer program product for carrying out the method, and a data carrier signal transmitting the computer program product.

An imaging system of this type is disclosed in WO 2014/124982 A1. In conjunction with a camera generating digital image data, such an imaging system permits the generation of image data sets which, in addition to two-dimensional image information, also contain information relating to the depth of pixels in the object space. In the case of the electronic image reproduction by means of such data sets, the additional depth information may be used, for example, to focus the image for various object depths of field.

SUMMARY OF THE INVENTION

The invention is based on the object of providing the plenoptic imaging system with additional functions.

This object is achieved according to the invention in that the imaging system includes a device for optical filtering, by means of which the image of the real intermediate image and/or at least one of the virtual mirror images can be filtered separately from one another.

Using the plenoptic imaging system according to the invention, it is possible to generate and possibly record differently filtered and possibly unfiltered images simultaneously using a single recording and to obtain items of information about the image depth.

The effort to obtain the different images and the items of image depth information is thus significantly reduced. In addition, the possibility is created of generating and possibly recording the differently filtered images at short time intervals, so that even such video recordings can be created.

It has proven to be particularly advantageous to link the items of information from the differently filtered images with items of information on the image depth. In this way, properties, which can be found by means of the filtering, of objects imaged using the imaging system may be ascertained depending on their distance from the imaging system.

In one embodiment of the invention, the imaging system comprises the image receiver surface and a device for processing a real image recorded by means of the image receiver surface. The image receiver surface expediently has at least one image recording sensor or is formed by at least one image recording sensor. In the preferred embodiment of the invention, the image receiver surface is formed by a single image recording sensor. The image recording sensor is preferably a CCD sensor or a CMOS sensor.

The device for processing the recorded image is expediently formed by a device for data processing, in particular a computer, which is configured in particular for processing data that are read out from the image recording sensor. In one embodiment of the invention, the data processing device is arranged in a housing of a camera, which is preferably part of the imaging system or is configured for use with the imaging system.

In one embodiment of the invention, the processing device is provided to determine from the image, with respect to the direction of the optical axis, positions of sections of the object which are imaged by at least individual ones of the pixels of the image. The mentioned items of information about the image depth can advantageously be obtained in this way. The position determination is preferably at least provided in such a way that the positions are determinable in the direction of the optical axis, in particular at least in relation to one another. In addition, it would be conceivable to provide the processing device in such a way that the positions may be ascertained as distances of the object area points from the imaging system at the time of the recording.

The processing device is expediently provided to determine the positions and for this purpose to ascertain how far identical sections of the object, in particular identical object points, in the images of the real intermediate image and at least one of the virtual intermediate images and/or in the images of at least two different virtual mirror images are represented arranged offset in relation to one another. The result of the offset representation and thus the differing reproduction of the object sections in the images is that the various images represent the object from different viewing angles and sections of the object change their positions relative to one another because of a parallax due to the different viewing angles.

In one embodiment of the invention, the filter device is arranged in front of the image receiver surface, preferably directly in front of the image receiver surface. A holding device is expediently provided, on which the filter device may be detachably arranged in front of the image receiver surface. The holding device is preferably formed on an objective housing and/or on a camera housing of the imaging system. The holding device is preferably provided with a device for adjusting, in particular aligning, the position of the filter device in the holding device. The adjustment is used to arrange the positions of the filters so that in each case precisely the beams which form the various images pass through them. The holding device can be provided with at least one alignment means, for example a set screw or the like, by means of which the position of the filter device or at least individual ones of the filters within the filter device may be changed. The alignment means can be provided for adjustment in the direction of the mentioned optical axis, perpendicular to the optical axis, and/or for rotation, for example around the optical axis or in the direction perpendicular to the optical axis.

In a further embodiment of the invention, the filter device is arranged in the imaging system in a position in which the image of the real intermediate image and the virtual mirror images are spatially separated from one another and in particular do not overlap.

In one embodiment of the invention, the filter device is arranged in the first imaging device or is part of the first imaging device. Furthermore, the filter device can be arranged in the intermediate image plane or in the direction of the optical axis directly in front of or behind the intermediate image plane.

The filter device expediently includes at least two optical filters. At least two of the optical filters preferably differ in their filter properties. The filter device can comprise at least one of the following filters: polarization filter, UV blocking filter, color filter, infrared blocking filter, neutral density filter, edge filter, interference filter, Bayer filter, complementary color filter, and/or fluorescence filter. The optical filters can differ due to the respective filter properties, even if multiple filters of the same type are used. For example, polarization filters can differ due to their orientations, interference filters due to the respective wavelength-dependent transmittances, the edge filters due to the respective separation of the spectral ranges, the neutral density filters due to their neutral densities, and/or the complementary color filters due to the respective color-specific wavelength-dependent transmissivity.

In particular if different neutral density filters are used, which preferably have neutral densities differing from one another, it is possible to create an HDR image (high dynamic range) using a single recording. In particular, videos may also be created in HDR.

Furthermore, it is possible to simulate, in particular to calculate, at least one filter effect with processing of the differently filtered images, for example by interpolation of images which have been recorded using different filters. For example, an orange filtered image may be created from a red and a green filtered image.

In one particularly preferred embodiment of the invention, the filter device includes a carrier, preferably a carrier frame, in which the optical filters are arranged, preferably detachably, in various filter positions. The carrier could be formed by two transparent glass plates, between which the filters are arranged. Furthermore, it would be conceivable to form the carrier by way of a plastic frame, at which insertion spaces for the filters are provided in the filter positions.

The filter device expediently includes N×N, preferably 3×3, 5×5, or 7×7, filter positions in a matrix arrangement. The matrix arrangement, when arranged in the imaging system, preferably extends in a direction perpendicular to its optical axis.

It is apparent that at least one filter position in the filter device can remain free of filters in order to obtain unfiltered images of the real intermediate image and/or at least one of the mirror images.

In one particularly preferred embodiment of the invention, at least two of the optical filters have the same filter properties. The mentioned position in the direction of the optical axis may then advantageously be determined particularly easily on the basis of the identically filtered images and items of information about the image depth may thus be obtained.

Similarly, at least two of the filter positions can remain free and the items of information about the image depth can be ascertained on the basis of the unfiltered images.

In one particularly preferred embodiment of the invention, the at least two optical filters which have the same filter properties are arranged in outer filter positions of the matrix arrangement and/or at least two of the outer filter positions remain free. The optical filters having identical filter properties are particularly preferably arranged in outer filter positions which are opposite to one another, in particular diagonally, and/or the mentioned outer filter positions remain free of filters. The information about the image depth may advantageously be determined particularly well with such an arrangement from the respective identically filtered or unfiltered images of the outer filter positions, since due to the viewing angles deviating more from one another, there is a greater parallax in the images.

In a further embodiment of the invention, the mentioned processing device is provided to determine the mentioned position in the direction of the optical axes from differently filtered images in the image. The processing device can be provided, for example by means of a comparison of intensities, colors, and/or brightnesses and possibly recognizable imaged contours, to associate pixels of the various images with one another and to ascertain the position as explained above.

In one particularly preferred embodiment of the invention, the processing device is provided to link items of information on the respective pixels from the various images, for example color, intensity, and/or brightness, and the positions in the direction of the optical axis of the respective pixels with one another. The possibility is thus advantageously created of associating items of information which may be ascertained by the possibly different filterings with the positions, in particular to represent the distance from the imaging system.

The filter device, in particular the mentioned carrier, is expediently provided with an identifier, which is preferably automatically readable. The identifier can contain items of information about the properties of the filter and the respective filter positions and/or can contain a code, on the basis of which the items of information may be retrieved from a database, possibly via the Internet.

The identifier can be formed by an optically readable code, preferably a barcode, a 2D code, a QR code, or the like or by a mechanical coding, which could be provided, for example, on the mentioned carrier frame.

Furthermore, it would be conceivable to provide the identifier on the filter device in such a way that an identification appears optically on the real image when a recording is created by means of the imaging device. The identifier could be formed on at least one of the filters or could be formed by a suitable optical element provided with the identification, which is placed in one of the filter positions.

The imaging system expediently has a device for reading the identifier. The processing device can be provided to retrieve the items of information about the properties of the filters and the respective filter positions from the database and/or to process them during the processing of the real image.

In a further embodiment of the invention, the imaging system has a device for automatically changing the optical filters. The automatic changing can take place in that individual ones or several of the optical filters and/or the mentioned carriers are exchanged. A filter magazine could be provided for exchanging the filters, which contains multiple different filters and from which the filters can be removed automatically for the insertion in the carrier and can be inserted again for storage. A filter wheel could be provided to exchange the entire carrier, which holds several of the wheel frames, preferably equipped differently with optical filters, and may be positioned on the imaging system in such a way that in each case another carrier frame acts in the imaging system.

In one embodiment of the invention, the second imaging device includes at least one mirror, preferably multiple mirrors, and/or at least one prism, preferably multiple prisms, for generating the images on the receiver surface. The mirror or mirrors and/or the prism or prisms are arranged in the second imaging device in such a way that multiple images of the object area can be generated on the receiver surface. Diverse different arrangements of mirrors and/or prisms are possible for this purpose in principle. It has proven to be particularly advantageous to provide the second imaging device in such a way that multiple mirrors are provided and arranged in such a way that the various light beams entering in an entry opening, depending on the beam path during the passage through the second imaging device, each penetrate without reflection through the second imaging device or are reflected on one or more of the mirror surfaces, possibly multiple times, before they leave the second imaging device again.

In one particularly preferred embodiment of the invention, the second imaging device comprises a kaleidoscope. Such a kaleidoscope expediently comprises at least one pair of planar mirror surfaces, wherein the mirror surfaces are arranged facing toward one another and at a distance from one another. At least some, preferably all, beam paths extend through the space between the mirror surfaces. The mirror surfaces are preferably arranged in parallel to one another. The kaleidoscope can include two or more mirror pairs. A tube can be formed from the mirror pairs, which is polygonal, preferably rectangular in cross section. The kaleidoscope could alternatively be formed by a cylindrical glass rod, which is polygonal in cross section and has lateral surfaces and mirrored end faces for the entry and exit of the light beams. The glass rod preferably has the shape of an equilateral triangle, a rectangle, in particular a square, or a regular pentagon, hexagon, heptagon, or octagon in cross section.

The mirrors and/or prisms are expediently provided in such a way that the various images represent the object area recorded from different viewing angles.

In one preferred embodiment of the invention, the first imaging device comprises at least one light entry lens, preferably multiple light entry lenses. The second imaging device is expediently formed in such a way that the light beams entering the second imaging device are split in accordance with their direction in such a way that they capture the object area from slightly different viewing angles but nonetheless represent the same object area.

The first imaging device is expediently provided in such a way that it images the object area on the intermediate image plane at an end of the second imaging device facing toward the first imaging device.

The light exit lens system is expediently formed in such a way that its focal plane is identical to the input plane of the second imaging device, in particular the kaleidoscope.

Embodiments of the imaging devices are described in WO 2014/124982 A1. The content of WO 2014/124982 A1 is incorporated in the present application by reference. Reference is specifically made to the text on page 7, first paragraph to page 11, second paragraph and FIGS. 1 to 3. Suitable imaging devices are described therein and their mode of operation is explained.

In one embodiment of the invention, the second imaging device is arranged on a side of the first imaging device which faces toward the image receiver surface.

The first, the second, and the third imaging device are expediently arranged in succession in the direction of the optical axis, wherein the second imaging device is preferably arranged between the first and the third imaging device.

In a further embodiment of the invention, the imaging system, in particular the imaging devices, is provided in such a way that an object space that can be imaged by means of the imaging system is arranged in front of the first imaging device as viewed in the direction of the optical axis toward the image receiver surface. In particular, the imaging system, in particular the imaging devices, is provided in such a way that the object space that can be imaged is arranged on the side of the first imaging device which faces away from the second imaging device.

In one particularly preferred embodiment of the invention, the imaging system forms an objective for a camera. The objective expediently comprises a housing, in which the imaging system is arranged. The objective is preferably provided with a device for mechanical fastening on a camera housing, for example an objective thread or an objective bayonet. Furthermore, it can be provided with a device for electrical or electronic connection and/or for data transmission with the camera housing.

As mentioned at the outset, the invention relates to a method for plenoptic imaging of an object area, in particular by means of a camera, in which an object area is imaged using multiple imaging devices arranged in succession in the direction of an optical axis, wherein the imaging devices comprise a first imaging device for generating a real intermediate image of an object in an intermediate image plane, a second imaging device for generating at least one virtual mirror image of the real intermediate image, which is arranged offset to the real intermediate image in the intermediate image plane, and a third imaging device for jointly imaging the real intermediate image and the virtual mirror image as a real image on an image receiver surface to be arranged at an axial distance to the intermediate image plane. The method is characterized in that the image of the real intermediate image and/or at least one of the virtual mirror images are filtered separately from one another.

The positions are expediently determined in the direction of the optical axis by object area points which are imaged by at least individual ones of the pixels of the image.

In one embodiment of the invention, the positions are determined in that it is ascertained how far identical sections of the object, in particular identical object points, are represented arranged offset in relation to one another in the images of the real intermediate image and at least one of the virtual intermediate images and/or in the images of at least two different virtual mirror images.

In one particularly preferred embodiment of the invention, the positions are solely ascertained from images in the real image, which are unfiltered or are filtered using optical filters which have identical filter properties. Alternatively or additionally thereto, the positions are ascertained from images in the real image which are filtered using optical filters which have different filter properties.

In one embodiment of the invention, in the various images, at least individual ones of the pixels are linked to points in the object area which they image and the positions of points in the object area in the direction of the optical axis are ascertained at least in relation to one another on the basis of the linkages. The linking can comprise an image analysis of the various images, in which the various pixels are assigned to the respective points in the object area which they image.

The invention furthermore relates to a method for processing the recorded real image. In the processing method, the separately filtered image of the real intermediate image and/or at least one of the virtual mirror images are processed depending on the respective filtering and/or positions in the direction of the optical axis are determined by object area points from the image imaged by at least individual ones of the pixels of the image.

The positions are expediently determined in that it is ascertained how far identical sections of the object, in particular identical object points, are represented arranged offset to one another in the images of the real intermediate image and at least one of the virtual intermediate images and/or in the images of at least two different virtual mirror images.

In one embodiment of the processing method, a filter effect is simulated, in particular calculated, for example by interpolation, with processing of the differently filtered images.

The invention furthermore relates to a computer program product, comprising commands which, upon the execution of the program by a computer, prompt it to carry out at least individual steps of the method for plenoptic imaging of an object area and/or the method for processing real images.

In particular, the computer program product comprises commands which, upon the execution of the program by a computer, prompt it to carry out at least one of the method steps mentioned hereinafter:
- generate the real image by means of the imaging device and/or while carrying out the imaging method,
- process the separately filtered image or images of the real intermediate image and/or at least one of the virtual mirror images depending on the respective filtering,
- from the separately filtered images of the real intermediate image and/or at least one of the virtual mirror images, determine positions in the direction of the optical axis of object area points imaged by at least individual ones of the pixels, possibly from differently filtered images,
- from the separately filtered images of the real intermediate image and/or at least one of the virtual mirror images, determine positions in the direction of the optical axis of object area points which are imaged by at least individual ones of the pixels, wherein the positions are in an object space which, viewed in the direction of the optical axis toward the image receiver surface, is arranged in front of the first imaging device and/or is arranged on the side of the first imaging device which faces away from the second imaging device.

The computer program product for recording the real image is expediently configured to initiate the image generation automatically, wherein the computer, on which the program runs, is configured in such a way that it, preferably due to an electrical and/or electronic connection to the imaging system or due to an implementation in the imaging system, can initiate the recording.

To determine the mentioned position, the computer program product is configured in one embodiment of the invention to ascertain how far identical sections of the object, in particular identical object points, are represented arranged offset in relation to one another in the images of the real intermediate image and at least one of the virtual intermediate images and/or in the images of at least two different virtual mirror images.

In one embodiment of the invention, the computer program product for processing the separately filtered image is provided to assign an item of information on the respective filter used for the imaging to the images of the real intermediate image and the at least one virtual mirror image. The computer program can be configured to retrieve the information automatically from a database, possibly via the Internet, as explained above.

The computer program product can expediently be loaded directly into the internal memory of a digital computer, and comprises software sections that can carry out the method steps when the computer program product runs on a computer, in particular a computer of the imaging system.

The computer program product is expediently a computer program stored on a data carrier, preferably RAM, ROM, CD, or the like, or a device, in particular a personal computer, a device having embedded processor, a computer embedded in a device, a smart phone, a computer of a device for creating an image recording, in particular a photo and/or video camera, or a signal sequence representing data suitable for transmission via a computer network, in particular the Internet.

The invention furthermore relates to a device for data processing, which comprises means for carrying out the method. The data processing device is preferably formed by a computer.

In one embodiment of the invention, the device is part of the mentioned imaging system. The device is expediently part of a camera, in particular a photo and/or video camera, which comprises the imaging system and/or is configured to be equipped with the imaging system.

In one particularly preferred embodiment of the invention, the data processing device is provided for operating the camera, in particular the photo and/or video camera, during the creation of an image recording by means of the camera.

The data processing device is expediently part of the imaging system, in particular the camera, and is formed therein, for example, by a processor and a memory which the processor can access.

The invention furthermore relates to a camera, in particular a photo and/or video camera, which comprises the imaging system and the mentioned data processing device.

The invention is explained in more detail hereinafter on the basis of exemplary embodiments and the appended drawings, which relate to the exemplary embodiments.

DETAILED DESCRIPTION OF THE INVENTION

Figure 1:
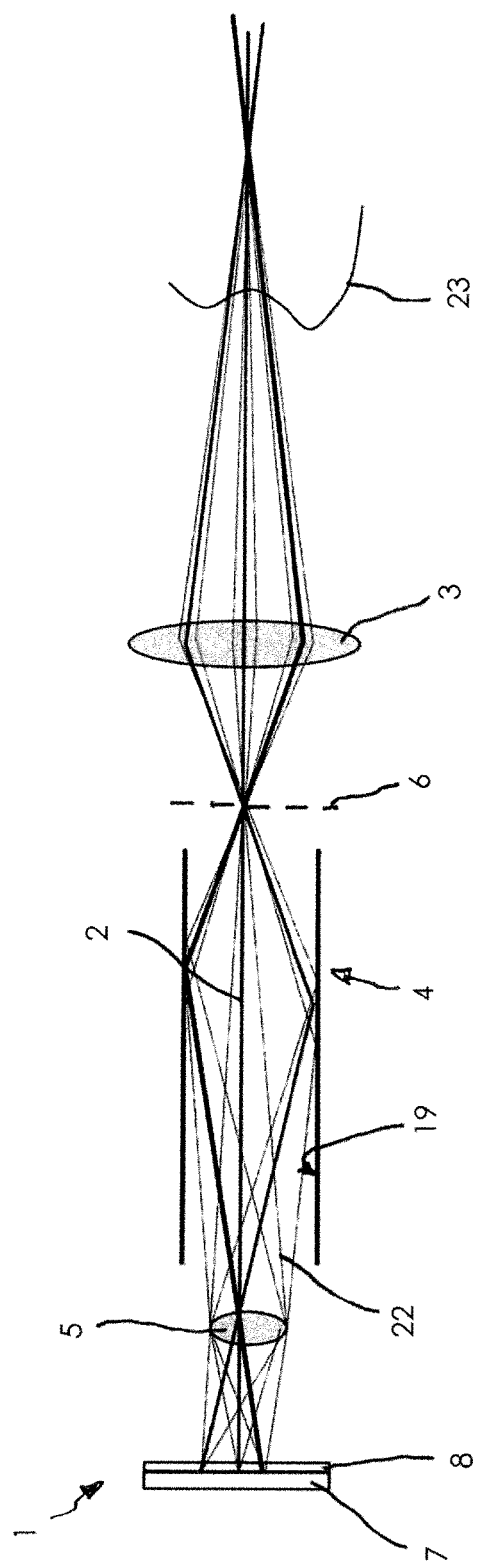
FIG. 1 shows an imaging system according to the invention.

FIG. 1 schematically shows how a plenoptic image recording is created using an imaging system 1 in a manner according to the invention. The imaging system 1 includes, in addition to an entry lens group 3 and an exit lens group 5, a mirror box 4 having mirrors 19, which, as shown in FIG.

Figure 3:
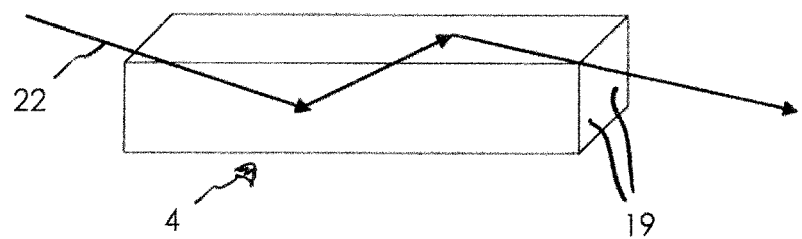
FIG. 3 shows a beam path of one of the imaging systems according to FIG. 1 or 2.
Figure 4:
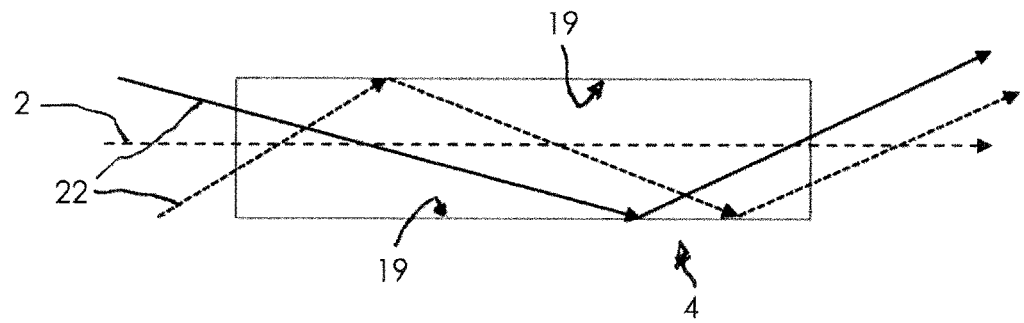
FIG. 4 shows further beam paths of one of the imaging systems according to FIG. 1 or 2.

3, are arranged rectangular in cross section in the mirror box 4. The mirror box 4 forms a kaleidoscope. Light beams 22 which originate from an object area, which images an object 23, enter the entry lens group 3 and are deflected by the entry lens group 3 into the interior of a mirror box 4. Some of the light beams 22 pass through the mirror box 4 up to the exit lens group 5 without striking one of the mirrors 19, other light beams are only reflected a single time on one of the mirrors 19 before they strike the exit lens group 5. Further light beams are in turn reflected multiple times on the mirrors 19 within the mirror box 4, wherein the reflections can take place both on mirrors 19 arranged opposite and also arranged adjacent to one another (cf. FIGS. 3 and 4). The exit lens group 5 is arranged in such a way that the light beams 22 exiting from the mirror box 4 are guided onto a receiver surface 7, which is formed by a sensor, in particular a CCD or CMOS sensor.

The entry lens group 3, the mirror box 4 and its mirrors 19, and the exit lens group 5 are arranged in such a way that nine images of the object area are formed on the receiver surface 7, which are generated adjacent to one another in a 3×3 grid. The images are generated in such a way that they image the object area originating from the entry lens group 4 from nine different viewing angles.

Figure 2:
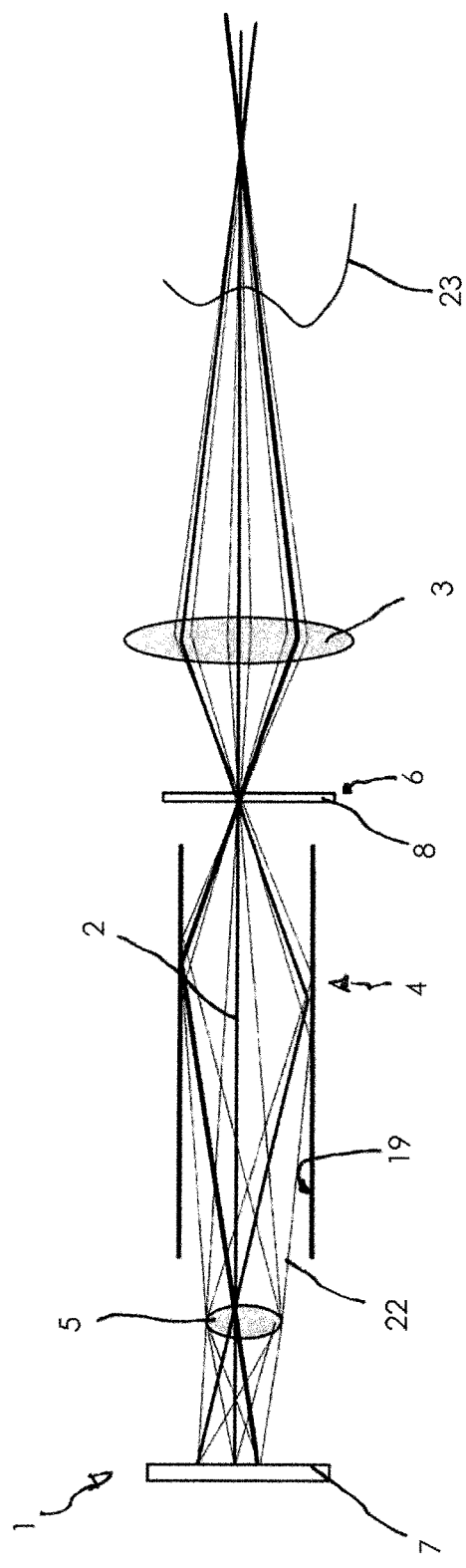
FIG. 2 shows a further imaging system according to the invention.

The imaging system 1 is provided with a filter device 8 which, as FIGS. 1 and 2 show, can be arranged in the imaging system 1 at various positions. FIG. 1 shows an arrangement of the filter device 8 directly in front of the receiver surface 7. In the arrangement according to FIG. 2, the filter device 8 is arranged in the intermediate image plane.

The filter device 8 can comprise two glass plates as a carrier, between which filters are arranged. Furthermore, a plastic frame can be provided as a carrier.

Figure 5:
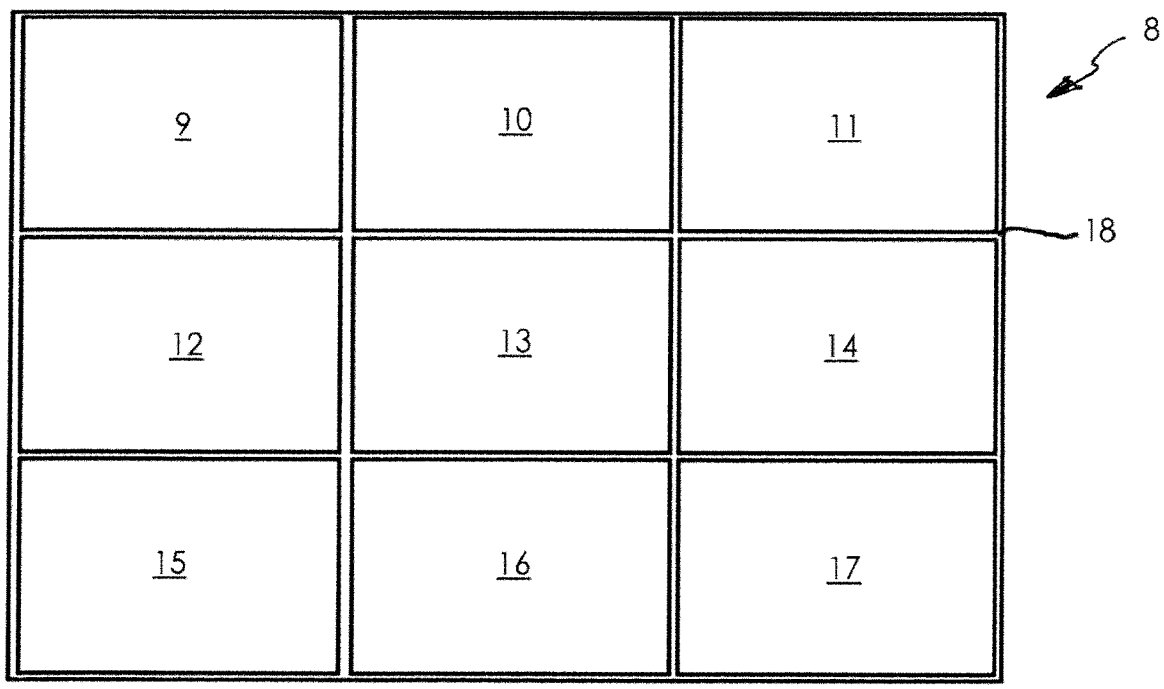
FIG. 5 shows a filter device of one of the imaging systems according to FIG. 1 or 2, FIG. 6 schematically shows a camera provided with the imaging system.

FIG. 5 shows that the filter device 8 has a carrier 18 having nine filter positions 9-17 for accommodating optical filters, which can remain unoccupied or can be occupied with possibly differing optical filters as needed. Each of the filter positions 9-17 is arranged so that in each case those light beams which form a respective one of the various images on the above-explained 3×3 grid pass through them.

The possibility is thus provided of simultaneously creating unfiltered and filtered and/or differently filtered images of the object area in a real image, which is incident on the receiver surface 7, using a single recording. In addition, it is possible due to the various viewing angles from which the individual images are recorded to determine items of information about positions in the direction of the optical axis of points of the object area which are reproduced by the individual pixels of the image, so that a statement may be made about the positions of the imaged object area points relative to one another with respect to the optical axis. Items of information can thus be obtained about the image depth.

The items of information about the mentioned positions may be ascertained comparatively easily from images which are filtered in the same manner or are unfiltered. Therefore, in one variant of the invention, for the position ascertainment, at least two of the filter positions 9-17 are occupied with filters of identical optical properties or at least two of the filter positions are left free and the positions are determined on the basis of the images which are identical or are unfiltered.

Figure 6:
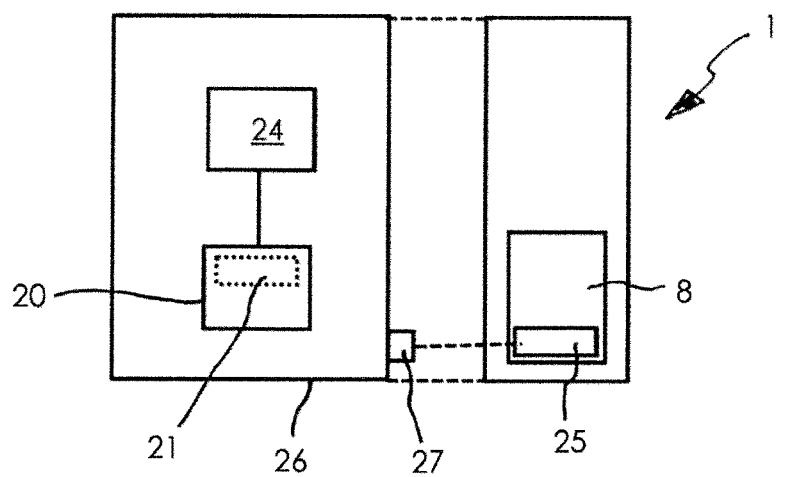

The imaging device 1 can comprise a computer 20, which is able to read out the sensor forming the image receiver surface 7 and store the read-out data. The computer 20 can be arranged, for example, on an objective supporting the imaging system 1 or, as schematically shown in FIG. 6, on a camera housing 26, which interacts with the imaging system 1. A computer 20 or another data processing device, to which the stored data are transmitted, possibly by means of the computer 20, is configured by means of a computer program 21 running thereon to process the differently filtered images from the stored image. The computer program 21 is provided for this purpose in such a way that each of the images may be assigned a respective filter property which corresponds to the filter which has filtered the respective image in the filter device. In the computer program 21, various data or data sets which match with filters provided for the filter device 8 can be stored in a retrievable manner in a database 24 for this purpose, so that the computer program 21 can automatically access the respectively matching data or data sets upon suitable setting.

If the filters may be exchanged, for example manually, on a carrier frame 18 of the filter device 8, the matching data sets for the respective filter positions can be selected by means of the computer program 21 in accordance with the selected arrangement. The computer program 21 can subsequently automatically evaluate the image recording on the basis of the data sets which relate to the optical filters.

Furthermore, one or more prefabricated filter devices 8 could be provided, in which the different filters are placed fixedly. Such filter devices 8 can be provided with an identifier schematically shown in FIG. 6, on the basis of which it may be read out with which filters the filter positions are occupied. It can be provided that the computer program 21 automatically retrieves a suitable data set from the database on the basis of the identifier in order to process the image recording. The identifier 25 of the filter device 8 could be read out automatically. For example, a code, such as a barcode, could be provided on the carrier frame, which is read out automatically, when an image recording is carried out, by means of a corresponding read device 27, which can be arranged on the camera housing. Alternatively, it would be conceivable to store the code in the image, for example in at least one of the images, so that it is automatically recognized upon analysis of the image recording data by the computer program 21 and computer 20 loads the matching data set on the basis of the recognized identifier.

Furthermore, it could be provided that during recording of an image recording, the identifier is radiated in an area of the receiver surface 7 which is not used to create the image recording, but is retrievable upon readout of the receiver surface 7.

In a first example, the filter positions 9, 11, 15, 17 and the central filter position 13 are free of filters in the filter device 8 according to FIG. 5. Neutral density filters of different neutral densities are arranged on the remaining filter positions 10, 12, 14, 16.

On an image recording, the mentioned positions can be determined on the basis of the images which result from beams which have been recorded by the filter positions in the corners and in the center of the receiver surface 7 to ascertain the image depth and furthermore an increased contrast in the recording can be achieved on the basis of the unfiltered and the differently filtered images. Suitable image processing, which is known per se and in which the increased contrast is ascertained from recordings having different exposure (so-called "exposure series") can be used for this purpose.

It is apparent that alternatively, for example, only two of the filter positions 9-17 could remain free of filters and the remaining filter positions could be occupied with filters of different neutral densities, in order to achieve a greater or a broader contrast resolution.

Furthermore, it could be provided that all of the filter positions 9-17 are provided with neutral density filters, or notwithstanding the preceding examples, two or more filters of the same neutral density are provided and the mentioned positions are ascertained on the basis of the images which have been generated using the filters of the same neutral density.

Due to the larger parallax which exists when the viewing angles, from which the images are generated, are as far apart from one another as possible, it is advantageous to leave two or more of the filter positions 9, 10, 11, 12, 14, 15, 16, 17 lying on the outside in the filter device 8 free or to provide them with filters of the same neutral density in order to determine the positions. The filter positions 9, 11, 15, 17, which form the corner positions in the filter device 8, are particularly well suited.

In a further exemplary embodiment, optical filters of another type are provided for the filter device 8 instead of the above-mentioned neutral density filters, for example polarization filters, color filters, complementary color filters, or fluorescence filters. In the filter device 8, such filters having different filter strength or filter effect can then respectively be provided and, as described above for the neutral density filter, increased filter resolutions can be achieved by the differently filtered images and the items of information about the mentioned positions can possibly be obtained.

In a further exemplary embodiment, optical filters of different types are arranged in the filter device. For example, different neutral density filters could be arranged on the filter positions 9-11, different UV filters could be arranged on the filter positions 12-14, and different color filters could be arranged on the filter positions 15-17. In this way, not only different gradations of the same filter effect, but different filter effects may be accommodated in a single image recording.

In another variant, the positions are ascertained from at least two images, which are optically filtered differently, or from at least one unfiltered and at least one filtered image. For this purpose, an image analysis of the individual images or at least two of the images is preferably carried out, in order to ascertain the pixels which represent the same points or areas of the imaged object in the object area from the differently filtered images. This information is required, as explained above, to be able to determine an offset in the representation.

Figure 7:
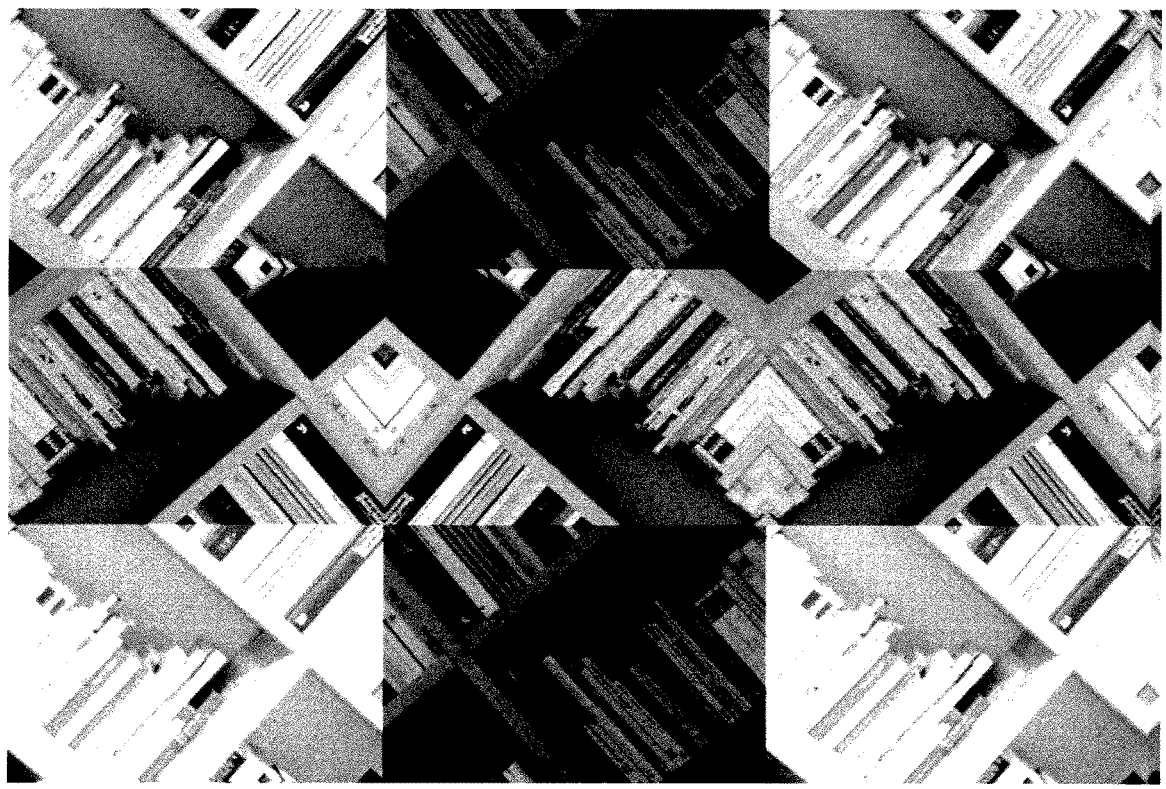
FIG. 7 shows an image recorded by means of the imaging system according to the invention.

FIG. 7 shows by way of example images of an object area in the form in which they are recorded upon a recording by means of the imaging system 1 on the receiver surface 7, which is equipped with a filter device 8 according to a further embodiment. In the exemplary embodiment, the filter positions 15 and 17 are free of filters and the other filter positions are equipped with neutral density filters of different neutral densities. As explained above, the images are incident in a 3×3 grid on the receiver surface 7.

The invention claimed is:

1. A plenoptic imaging system, comprising: multiple imaging devices arranged in succession in a direction of an optical axis, the multiple imaging devices including a first imaging device configured to generate a real intermediate image of an object in an intermediate image plane, a second imaging device configured to generate at least one virtual mirror image of the real intermediate image, which virtual mirror image is arranged offset to the real intermediate image in the intermediate image plane, and a third imaging device for jointly imaging the real intermediate image and the virtual mirror image as a real image on an image receiver surface to be arranged at an axial distance to the intermediate image plane; and an optical filtering device configured to filter the image of the real intermediate image and/or at least one of the virtual mirror images separately from one another, wherein the filtering device is arranged directly in front of the image receiver surface or is arranged in the intermediate image plane or in the direction of the optical axis directly in front of or directly behind the intermediate image plane.

2. The imaging system according to claim 1, further comprising a processing device for processing a real image recorded by the image receiver surface, the processing device being configured to determine, with respect to the direction of the optical axis, positions of sections of the object, which are imaged by at least individual ones of the pixels of the image, from the image.

3. The imaging system according to claim 2, wherein the processing device is configured to determine the positions and to ascertain how far identical sections of the object are represented arranged offset in relation to one another in the images of the real intermediate image and at least one of the virtual intermediate images and/or in the images of at least two different virtual mirror images.

4. The imaging system according to claim 1, wherein the filtering device is arranged in the first imaging device or is part of the first imaging device.

5. The imaging system according to claim 1, wherein the filtering device includes at least two optical filters.

6. The imaging system according to claim 5, wherein the filtering device includes a carrier, in which the optical filters are arranged in various filter positions.

7. The imaging system according to claim 1, further comprising a device for holding the filtering device, wherein the holding device includes a device for adjusting a position of the filtering device in the holding device.

8. The imaging system according to claim 5, wherein the filtering device includes N×N filter positions in a matrix arrangement, wherein the matrix arrangement extends in a direction perpendicular to the optical axis.

9. The imaging system according to claim 8, wherein the filtering device includes 3×3, 5×5, or 7×7 filter positions in the matrix arrangement.

10. The imaging system according to claim 8, wherein at least two of the optical filters have the same filter properties, wherein the at least two optical filters, which have the same filter properties, are arranged in outer filter positions of the matrix arrangement.

11. The imaging system according to claim 10, wherein the at least two optical filters, which have the same filter properties, are arranged in outer filter positions of the matrix arrangement opposite to one another diagonally.

12. The imaging system according to claim 1, wherein the second imaging device includes at least one mirror for generating the at least one virtual mirror image, wherein the second imaging device preferably forms a kaleidoscope.

13. The imaging system according to claim 12, wherein the second imaging device forms a kaleidoscope.

14. The imaging system according to claim 5, wherein the filtering device includes an identifier operative to ascertain and/or retrieve properties of the optical filters and/or an arrangement of the optical filters in the filtering device.

15. A method for plenoptic imaging of an object area, comprising the steps of: imaging the object area using multiple imaging devices arranged in succession in a direction of an optical axis, wherein the imaging devices include a first imaging device for generating a real intermediate image of an object in an intermediate image plane, a second imaging device for generating at least one virtual mirror image of the real intermediate image, which is arranged offset to the real intermediate image in the intermediate image plane, and a third imaging device for jointly imaging the real intermediate image and the virtual mirror image as a real image on an image receiver surface to be arranged at an axial distance to the intermediate image plane; and filtering the image of the real intermediate image and/or at least one of the virtual mirror images separately from one another using a filtering device arranged directly in front of the image receiver surface or arranged in the intermediate image plane or in the direction of the optical axis directly in front of or directly behind the intermediate image plane.

16. The method according to claim 15, including determining positions in the direction of the optical axis of object area points, which are imaged by at least individual ones of pixels of the image.

17. The method according to claim 16, wherein the positions are determined by ascertaining how far identical sections of the object are represented arranged offset in relation to one another in the images of the real intermediate image and at least one of the virtual intermediate images and/or in the images of at least two different virtual mirror images.

18. The method according to claim 16, including ascertaining the positions only from images in the real image, which are unfiltered or are filtered using optical filters that have identical filter properties.

19. The method according to claim 16, including ascertaining the positions from images in the real image which are filtered using optical filters that have different filter properties.

20. The method according to claim 15, wherein in the various images, at least individual ones of the pixels are linked to points in the object area which they image and the positions of points in the object area in the direction of the optical axis are ascertained at least in relation to one another based on the linkages.

21. A computer program product stored on a nontransitory computer readable medium, the computer program product comprising commands which, upon execution of the program by a computer, prompt the computer to carry out the method according to claim 15.

22. A computer program product stored on a nontransitory computer readable medium, the computer program product comprising commands which, upon execution of the program by a computer, prompt the computer to determine positions in a direction of an optical axis of object area points which are imaged by at least individual ones of pixels from separately filtered images of a real intermediate image and/or at least one virtual mirror image, which have been generated by the imaging system according to claim 1.

23. The computer program product according to claim 22, comprising commands which, upon the execution of the program by the computer, prompt the computer to process separately filtered images of the real intermediate image and/or at least one of the virtual mirror images in dependence on the respective filtering by the imaging system.

24. The computer program product according to claim 22, wherein the computer program product is a computer program stored on one of the group consisting of: a data carrier; a personal computer; a device having an embedded processor; a computer embedded in a device; a smart phone; a computer of a device for creating an image recording; or a signal sequence representing data suitable for transmission via a computer network.

25. A device for data processing, comprising means for carrying out the method according to claim 15.

26. The device according to claim 25, wherein the device is part of an imaging system and/or is a camera.

* * * * *